United States Patent [19]

Kunkel et al.

[11] Patent Number: 4,955,786
[45] Date of Patent: Sep. 11, 1990

[54] DRIVE DEVICE FOR PUMPS

[75] Inventors: Heinrich Kunkel, Schweinfurt; Heinz Kiener, Waigolshausen; Armin Olschewski, Schweinfurt, all of Fed. Rep. of Germany

[73] Assignee: SKF Kugellagerfabriken GmbH, Fed. Rep. of Germany

[21] Appl. No.: 394,531

[22] Filed: Aug. 16, 1989

[30] Foreign Application Priority Data

Aug. 20, 1988 [DE] Fed. Rep. of Germany ....... 3716098

[51] Int. Cl.$^5$ .............................................. F04D 29/04
[52] U.S. Cl. .................................. 415/110; 415/174.2;
415/229; 416/170 R; 417/362; 474/903;
384/461
[58] Field of Search ...................... 415/110, 111, 170.1,
415/168.1, 174.2, 174.3, 229, 230, 231; 416/170
R, 171, 174, 60; 417/362; 474/903; 384/461,
517, 543, 546; 463/359, 325, 327

[56] References Cited

U.S. PATENT DOCUMENTS

| | | | |
|---|---|---|---|
| 1,897,280 | 2/1933 | Schwitzer et al. | 415/174.3 |
| 2,709,567 | 5/1955 | Wood | 415/111 |
| 3,260,541 | 3/1962 | Sadler et al. | 403/359 |
| 3,796,507 | 3/1974 | Smykal et al. | 415/111 |
| 3,934,966 | 1/1976 | Asberg | 415/170.1 |
| 4,388,040 | 6/1983 | Sakamaki | 415/174.2 |
| 4,619,587 | 10/1986 | Linnig | 417/362 |
| 4,715,780 | 12/1987 | Kan | 415/230 |
| 4,881,842 | 11/1989 | Farrell et al. | 403/359 |

Primary Examiner—Edward K. Look
Assistant Examiner—Hoang Nguyen
Attorney, Agent, or Firm—Eugene E. Renz, Jr.

[57] ABSTRACT

A drive device for pumps consists of a drive pulley to drive a shaft. The shaft assembly includes an inner bearing seated in the housing bore, an outer bearing seated on a neck of a pump cover, a cover disk with an outer edge, covering the outer bearing and the neck of the pump cover laterally from the outside and is connected to the drive pulley, and a center of the shaft, a spring for the automatic play eliminating adjustment of the radial and axial load-supporting outer and inner bearing.

9 Claims, 2 Drawing Sheets

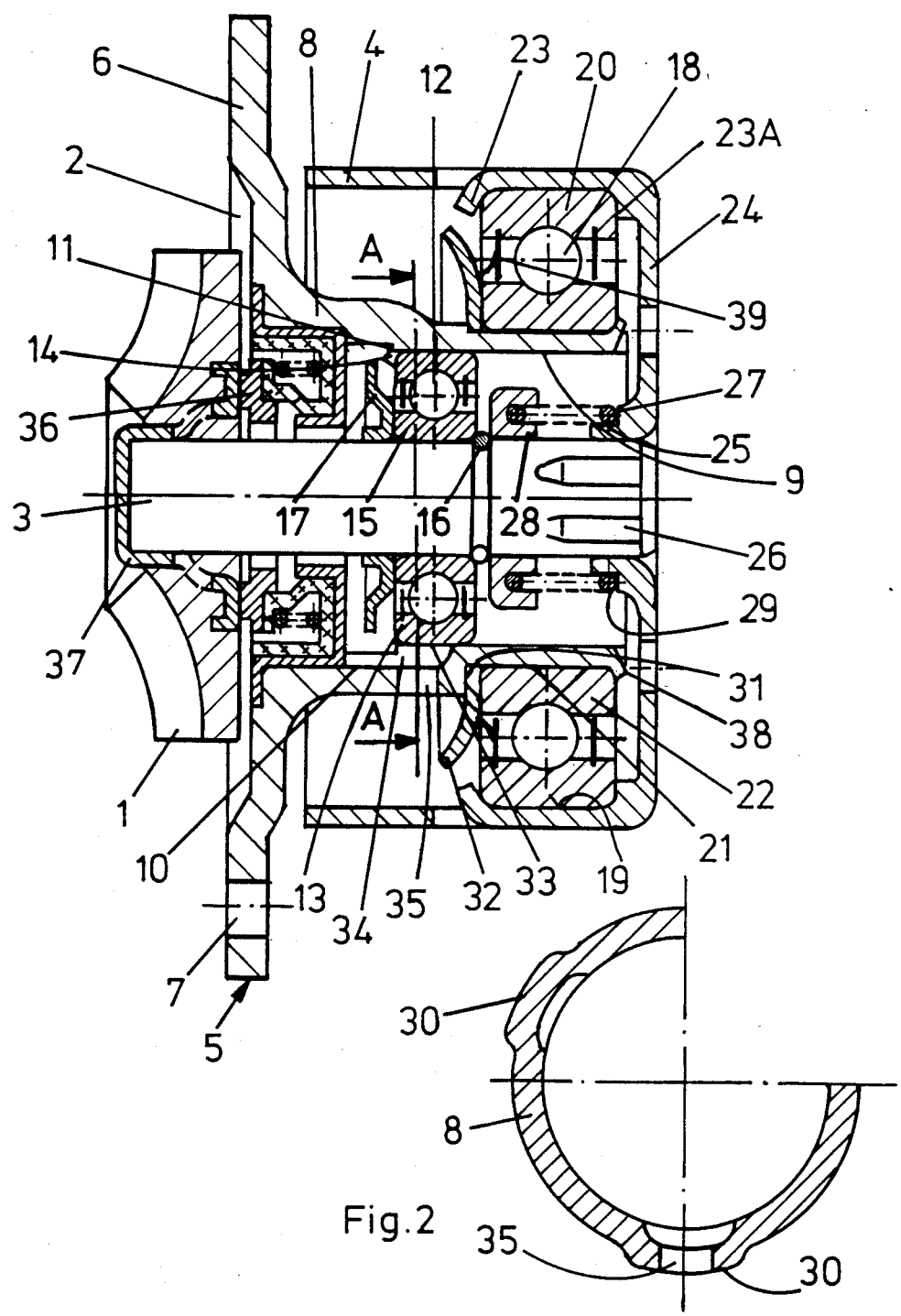

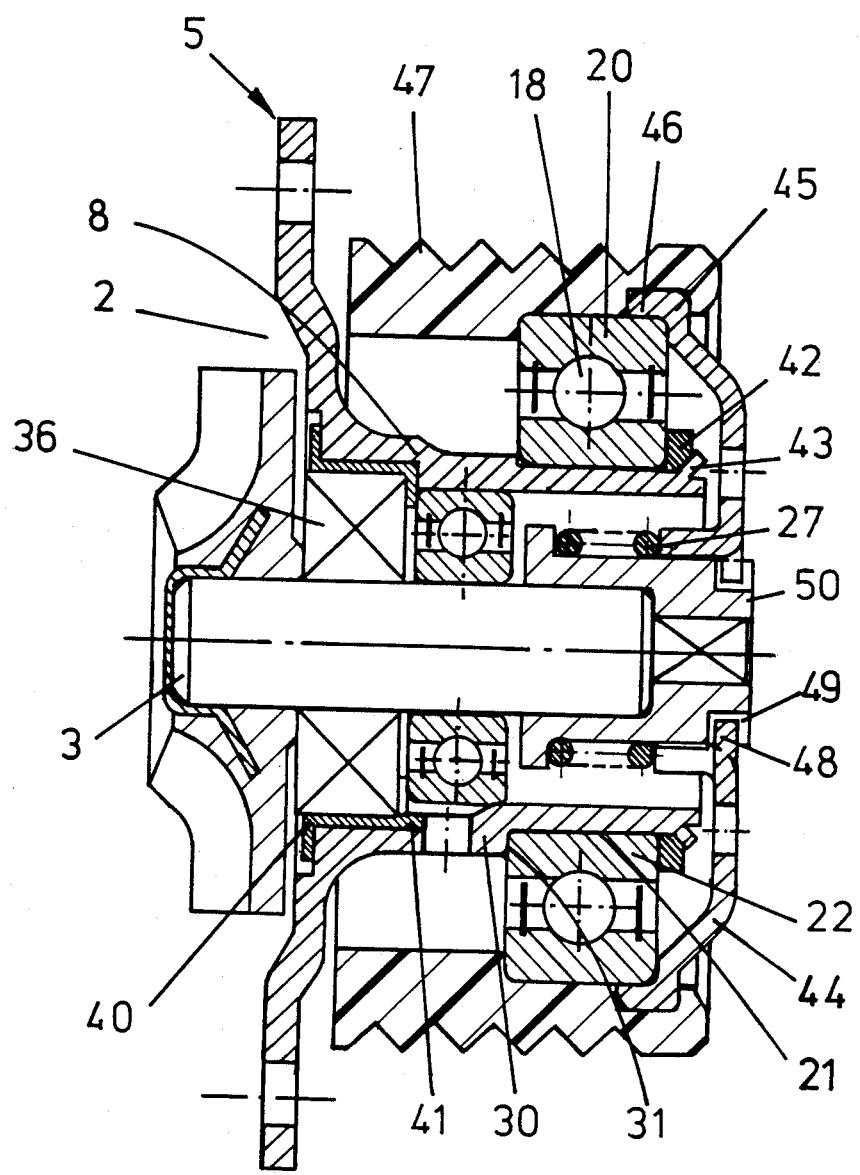

DRIVE DEVICE FOR PUMPS

FIELD OF THE INVENTION

The present invention relates to drive devices or mechanisms for pumps.

BACKGROUND OF INVENTION

These drive devices are not new per se. Pumps utilizing drive devices of the general type to which the present invention relate generally comprise a pump rotor mounted in a pump chamber and a pump cover surrounding the rotor having a neck defining a housing bore and a shaft rotatably journaled in the housing bore. The drive pulley is supported by an outer bearing on the lateral surface of the neck and the shaft is supported in an inner bearing in the housing bore of the neck. The bearings are typically designed to absorb radial and axial load. In accordance with a well known prior type, the inner ring of the radial and axial load supporting outer bearing is seated on a cylindrical lateral surface section at the neck of the pump cover. The end surface of the inner ring, which faces the pump chamber, is supported on a ring-shaped peripheral should surface of the neck. This arrangement is shown in West German Pat. No. 3,716,098,2.

The shoulder surface is usually continuous about the periphery and in order to form this shoulder, the pump cover must either be designed with thick walls or its neck must be designed in the shape of a "z" in longitudinal cross section at the area of the shoulder surface. It has been found that fabrication of the pump cover with a drive device of the type described can be extremely expensive by reason of the fact that a large amount of material must be machined away to form the shoulder. It is likewise cumbersome and expensive to recess the shoulder in the form of a "z" at the point of the transition from the section of larger diameter to the section of smaller diameter.

SUMMARY OF THE INVENTION

With the foregoing in mind, it is an object of the present invention to provide an improved drive device for pumps of the type described above, which is of extremely compact design and is characterized by novel features of construction and arrangement so it can be manufactured very economically. To this end, and in accordance with the present invention, the neck of the pump cover has relatively thin walls and the inner bearing rings relatively thin walls and the inner bearing ring of the outer bearing is seated firmly on a cylindrical section of the lateral surface of the neck and that the neck has plastically formed therein a plurality of axially oriented bulges projecting radially from the lateral surface section. Each bulge is provided with a shoulder surface on the end thereof which faces away from the pump chamber for a limited peripheral support of an opposing end surface of the inner bearing ring. By reason of this construction, the pump cover can be produced economically in mass quantities from thin-wall tubing or the like or from thin strip material by pressing, deep drawing or stretching. The bulges can be formed by utilizing relatively small forces in the thin wall neck of the pump cover. Conventional die stamping techniques can be used to form the bulges by pressing axially into the housing bore of the shoulder. This construction, and particularly by reason of the thin walled neck section, the drive device is advantageously very light in weight.

Another functional advantage in providing bulges about the periphery of the neck is that the inner ring of the outer axial and radial load supporting bearing is supported in the direction of the pump chamber only by shoulder surface sections of the bulges. The bulge configuration around the periphery of the neck also produces the advantage that the inner ring of the outer axial and radial supporting bearing is supported in the direction of the pump chamber only by the shoulder surface sections of the bulges. Thus even though the walls of the neck are thin, the neck is highly resistant to bending, which is essential because the axially oriented bulges produce a stiffening effect. Consequently, the neck can absorb large radial forces such as those exerted by the belt of the drive pulley without damage to the system. By reason of this construction, a drive device constructed in accordance with the present invention is particularly suitable for high load cooling water pumps in motor vehicles.

There are other specific features of the present invention which provide certain functional advantages. For example, the shoulder sections of the bulges on the neck of the pump cover are located in a radial plane perpendicular to the axis of rotation of the shaft. By this configuration the inner ring of the outer roller bearing is supported on the shoulder surface section in a rotationally symmetric manner thereby obviating skewing forces.

In accordance with another feature of the present invention each bulge is located radially over an outer surface of the outer ring of the inner bearing which seats firmly in the housing bore of the neck. Thus, the inner ring of the outer roller bearing extends in a radial direction at least partially over the lateral surface of outer ring of the inner roller bearing.

In accordance with another feature, the housing bore opens out at the end facing the pump chamber to a radially expanded section of the bore of the pump cover. Thus the bulges can be formed in the neck of the pump cover by means of a die press which can be pressed axially into the housing bore of the neck from the bore expansion of the pump cover. This greatly simplifies the manufacturing process.

In accordance with still another feature of the present invention, the shaft is supported horizontally and at least one of the bulges is located in the lower area of the periphery of the neck and at least one radially outwardly directed leakage hole for a ring seal seated in the expanded section of the bore is provided between the pump chamber and the inner bearing which is machined into a wall of the lower bulge. Thus the bulge in the lower area of the neck serves to collect any liquid which may have leaked from the from the sliding ring seal. Liquid can then escape to the outside through the leak hole. This presents the advantage that pump fluids are prevented from escaping and intruding into the inner bearing and causing damage thereto.

BRIEF DESCRIPTION OF THE DRAWINGS

These and other objects of the present invention and the various features and details of the operation and construction thereof are hereinafter more fully set forth with reference to the accompanying drawings, wherein:

FIG. 1 is a longitudinal cross sectional view of the drive unit constructed in accordance with the present invention;

FIG. 2 is a partial cross sectional view taken along lines A—A in FIG. 1 through the neck of the pump cover; and FIG. 3 is a longitudinal sectional view similar to FIG. 1 through a modified drive unit constructed in accordance with the present invention.

DETAILED DESCRIPTION OF THE PREFERRED EMBODIMENT

Referring now to the drawings and particularly to FIG. 1 thereof, there is shown a drive device or assembly constructed in accordance with the present invention for a water pump utilized to cool an internal combustion engine. The drive device, which can be mounted on an engine block (not shown), comprises a pump rotor 1 which projects into a pump chamber 2. A drive shaft 3 is connected in a torsion proof manner at one end to pump rotor 1 and its other end via a coupling element 3a to a cylindrical drive pulley 4.

The drive assembly includes a pump cover 5 formed of thin sheet metal steel which surrounds pump chamber 2. Pump cover 5 has a radially outwardly directed flange 6, with mounting holes 7, circumferentially spaced about its periphery and a generally cylindrical or tubular neck 8 which projects outward in the direction of the axis of shaft 3 and which has a cylindrical housing bore 9 extending outwardly from the pump chamber 2. As illustrated, shaft 3 of the pump passes through housing bore 9.

Housing bore 9 and shoulder 8 opens outwardly at the end facing the pump chamber 2 into a cylindrically offset radial expansion 10 of the bore. A ring shaped shoulder 11, which is plastically formed in the neck 8, is located at the juncture of the housing bore 9 and housing expansion and radially outwardly offset radial section 10.

Shaft 3 is rotatably journaled inside the neck 8 on an inner bearing 12, which may comprise a conventional radial and axial force-absorbing grooved ball bearing. Outer ring 13 of bearing 12 is permanently seated in housing bore 9. The outer axial endface of outer ring 13 facing pump chamber 2 is held axially on the ring shaped shoulder 11 by means of peaned over areas 14 which project radially inwardly beyond housing bore 9. Inner ring 15 of bearing 12 is permanently seated on shaft 3. The axial end face of inner ring 15 facing away from pump chamber 2 is held axially in place by means of a spring ring 16 of steel wire, having a circular cross section which snaps into a ring shaped groove 16a in the shaft and projects beyond the lateral surface of the shaft. The inner ring is held in place on the side facing the pump chamber by a spring ring 17 of sheet steel permanently seated on the lateral surface of shaft 3.

The drive pulley 4 of the drive assembly is supported by an outer bearing, 18, which is similar to the bearing 12, and is designed as a radial and axial force absorbing grooved ball bearing. This bearing has an outer ring 20 permanently seated in a bore 19 of the drive pulley 4 and an inner ring 22 permanently seated on a cylindrical section 21 of the lateral surface of the neck. Outer ring 20 is held in place on the side facing the pump chamber 2 in the bore of the drive pulley 4 by several radially inwardly bent tongues or axially peaned over areas 23. A ring shaped shoulder 23a is formed on the opposite side by being peaned over axially in the bore of the drive pulley 4.

The drive assembly further includes a covered disc 24 which covers outer bearing 18 and neck 8 laterally from the outside and it is connected integrally to the drive pulley at its radially outer edge 24a. Cover 24 has a hub-like central section 25 with a central hub bore 25a. The outer end 3a of shaft 3 has a flattened planar surface as at 26 about its periphery to engage in the complementary shaped hub bore 25a to form a torsion proof connection. The flats 26 are separated by arcuate sections 26b circumferentially spaced around the periphery of the shaft 3 which functions to center and guide the central section 25. Cover disk 24 is thus connected in a torsion proof manner to shaft 3 by the connection at the central section 25 which is configured in such a way that the disk is free to move axially. Cover disk 24 then serves as a coupling element between drive pulley 4 and shaft 3.

Means is provided for adjusting the outer and inner bearings 18 and 12 automatically to eliminate play and to this end center section 25 carries a compressed helical spring 27 on its lateral surface. This spring 27 acts between a support ring 28 on shaft 3 and a ring shoulder 29 at center section 25. Helical spring 27 serves as an adjusting means to tighten cover disk 24 in an elastic manner outwardly with respect to pump cover 5, that is, in a direction away from the pump chamber 2.

The neck 8 of pump cover 5 has a number of axially extending bulges or protrusions 30 distributed uniformly about its periphery having walls of approximately the same thickness as the cylindrical section 8a of the neck 8. This is best illustrated in FIG. 2. The bulges can be formed plastically in the neck 8 by an axially directed impression of a conventional forming die (not shown).

As best illustrated in FIG. 2, each bulge projects radially beyond the cylindrical lateral surface section 21 and has a flat shoulder surface section 31 on the end facing away from the pump chamber 2. Each shoulder surface section 31 merges directly into lateral surface section 21 of neck 8. A thin cover disk 32 made of sheet steel is provided between an end surface of bearing inner ring 15 facing pump chamber 2 and the three shoulder surface sections 31. The disk 32 is permanently seated in lateral surface section 21. The shoulder surface section 31 and the end surface of bearing inner ring 15 opposite these sections are in a radial plane P—P extending perpendicularly to the axis of rotation A—A of shaft 3.

In accordance with the particular configuration illustrated, each bulge is located radially opposite a cylindrical outer surface 33 of bearing outer ring 13 to thereby define a cavity 34 therebetween. The cavity 34 terminates adjacent the outer surface of bearing ring 13 in the area facing away from the pump chamber 2 to thereby seal the ring axially from the outside. Cavity 34 opens out into the bore expansion of pump cover 5 on the end facing toward the pump chamber 2.

As illustrated, shaft 3 is supported horizontally and is flanged to the block of the internal combustion engine in such a way that one of the three bulges 31 is located at the lower most point on the periphery of neck 8. The wall of this lower most bulge is provided with a leakhole 35 for a ring seal 36 permanently in bore expansion 10 between inner ring 12 and pump chamber 2. The drainage or leak hole 35 is illustrated extending radially to the outside from the cavity 34. Ring seal 36 has a ceramic ring elastically tightened which slides on the end surface of the stiffening disk 37 of rotating pump rotor 1 to form a seal.

Means is provided for securing bearing inner ring 22 on the lateral surface section 21 from being displaced or pulled off lateral surface section 21. This means comprises a number of projections 38 circumferentially spaced adjacent the inner edge of the neck 8 adjacent the axially end thereof facing away from the pump chamber. The projections 38, in the present instance, are formed by the plastic outward ending of the circumferential sections of the neck 8. As illustrated, the projections 38 extend radially beyond lateral surface section 21 and are pressed firmly against an end surface of inner ring 22 facing away from pump chamber 2.

The inner and outer bearings 12 and 8, respectively, are each sealed on both sides by a sealing ring permanently seated in bearing outer rings 13 and 20. To the side facing pump chamber 2, outer bearing 18 is provided with a sealing ring 39 having two sealing lips 39a and 39b. One of the two sealing lips 39a, 39b slides on bearing inner 22 and the other on cover disk 32.

Illustrated in FIG. 3 is a modified form of dry system for a pump in accordance with the present invention. The overall design and arrangement of the components is generally similar to that described above. However, in accordance with this embodiment of the invention, the device includes a mounting ring 40 made of sheet steel serving as a housing for ring seal 36. The mounting ring 40 has a projection 41 facing away from pump chamber 2 which engages axially in a bulge 30 of neck 8 of pump cover 5. By this arrangement, the mounting ring 40 is locked against turning in pump cover 5. Furthermore, shoulder surface sections 31 and bulges 30 and the opposite end surface of the inner ring surface 22 are on the same radial plane P'—P' extending perpendicularly to the axis of the rotation of shaft 3A-a.

Means is also provided for locking bearing inner ring 22 in place on lateral surface section 21. This means comprises a flange ring 42 located on lateral surface extension 21 of neck 8 on the side thereof facing away from pump chamber 2 which is permanently held in place in the lateral direction by peaned over projections 43 of the free end of neck 8. Serving as the coupling element, the modified drive device as shown in FIG. 3 has a covered disk 44 having radially projected retaining tabs 45 which are bent in a direction toward the pump chamber 2. These tabs serve to connect cover disk 44 in a centered and torsion proof manner to the pulley by reason of the fact that each of the retaining tabs 45 is snapped into a retaining recess 46 in the bore of drive pulley 47 of elastic material such as plastic.

The center section of cover disk 44 is provided with radially inwardly projecting retaining tabs 48 which engage in grooves 49 of an intermediate bushing 50 with axially play so that the cover disk 44 is held in place only in the peripheral direction and not in the axial direction by intermediate bushing 50. This bushing 50 is permanently seated without play on shaft 3 in a torsion proof manner. A helical spring 27, located between the center section of cover disk 44 and intermediate bushing 50, serves to permit adjustment of the inner bearing 12 and the outer bearing 18 to eliminate play. This spring pushes cover disk 44 axially outward and away from pump cover 5 to achieve this function.

Even though particular embodiments of the present invention have been illustrated and described herein, it is not intended to limit the invention and changes and modifications may be made therein within the scope of the following claims.

What is claimed is

1. Drive device for pumps consisting of a pump rotor mounted in a pump chamber; a pump covering the pump chamber with a projecting neck provided with a housing bore passing all the way from the pump chamber to the outside; and a shaft which passes through said housing bore and which is connected at its inner end to the pump rotor and at its outer end to a drive pulley; means rotatably supporting the shaft comprising an inner bearing seated in the housing bore and the drive pulley on an outer bearing seated on a lateral surface of the neck; a cover disk with an outer edge, covering the outer bearing and the neck of the pump cover laterally from the outside and is connected to the drive pulley, and a center section connected to the shaft, adjusting means for the automatic play-eliminating adjustment of the radial and axial load-supporting outer and inner bearing including means acting in an elastic manner to move the cover disk either inward toward the pump chamber or outward away from the pump chamber with respect to the pump cover, the neck (8) of the pump cover (5) being defined by thin wall and in that an inner bearing ring (22) of the outer bearing (18) is seated firmly on a cylindrical section (21) of the lateral surface of the neck (8); and in that this neck (8) has plastically formed, axially oriented bulges (30) projecting radially from the lateral surface section (21), each bulge (30) having on the end which faces away from the pump chamber (2) a shoulder surface section (31) for limited peripheral support of an opposing end surface of the bearing inner ring (22).

2. Drive device according to claim 1, wherein the shoulder surface sections (31) of the bulges (30) on the neck (8) of the pump cover (5) are on a radial plane perpendicular to the axis of rotation of the shaft (3).

3. Drive device according to claim 1, wherein each bulge (30) on the shoulder (8) of the pump cover (5) is located radially over an outer surface (33) of a bearing outer ring (13) of the inner bearing (12), said surface 33 being seated firmly in the housing bore (9) of the neck (8).

4. Drive device according to claim 1, wherein each bulge (30) on the shoulder (8) of the pump cover (5) is located radially over an outer surface (33) of a bearing outer ring (13) of the inner bearing (12), this surface being seated firmly in the housing bore (9) of the neck (8).

5. Drive device according to claim 1, wherein the housing bore (9) of the neck (8) of the pump cover (5) opens out at the end facing the pump chamber (2) into a radially expanded section (10) of the bore of the pump cover (5).

6. Drive device according to claim 5, wherein the shaft (3) is supported horizontally in that at least one of the bulges (30) is located in the lower area of the periphery of the neck (8), and in that at least one radially outward-directed leakage hole (35) for a ring seal (36) seated in the expanded section (10) of the bore between the pump chamber (2) and the inner bearing (12) is machined into a wall of the lower bulge(s) (30).

7. Drive device according to claim 6, wherein the ring seal (36) is installed in a mounting ring (40), which, at the end facing away from the pump chamber (2), has projection (41) which engages axially with at least one of the bulges (30) on the neck (8) of the pump cover (5).

8. Drive device according to claim 4, wherein means defining a cavity (34) which terminated in front of an end of the outer surface (33) facing away from the pump chamber (2), included between each bulge (30) on the neck (8) of the pump cover (5) and the opposing outer surface (33) of the bearing outer ring (13) of the inner bearing (12) are provided.

9. Drive device according to claim 1, wherein the neck (8) of the pump cover (5), on the end facing away from the pump chamber (2), has at least one projection (38, 43) which projects radially over the lateral surface section (21) of the neck preventing the inner bearing ring (22) of the outer bearing (18) from being pulled from the lateral surface section (21), and is produced by the plastic deformation of this end.

* * * * *